J. ROSINSKY.
POTATO CHIPPER AND SLICER.
APPLICATION FILED JUNE 4, 1920.
1,358,020.
Patented Nov. 9, 1920.
2 SHEETS—SHEET 1.
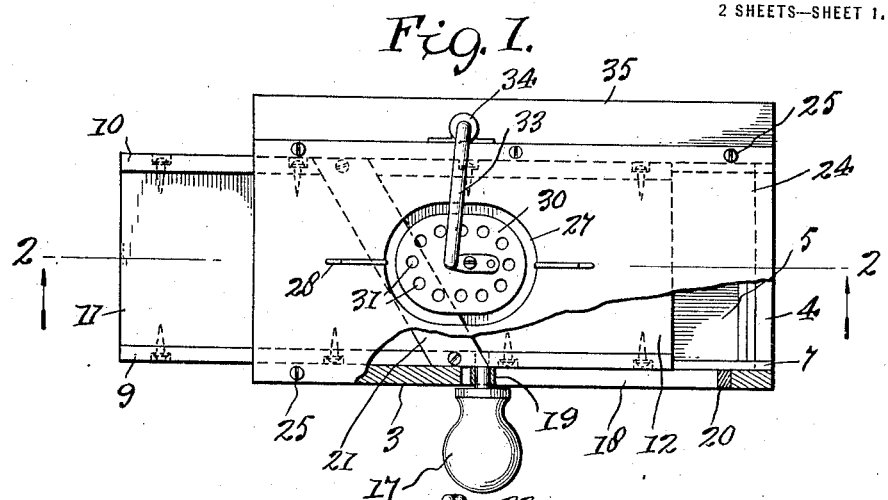
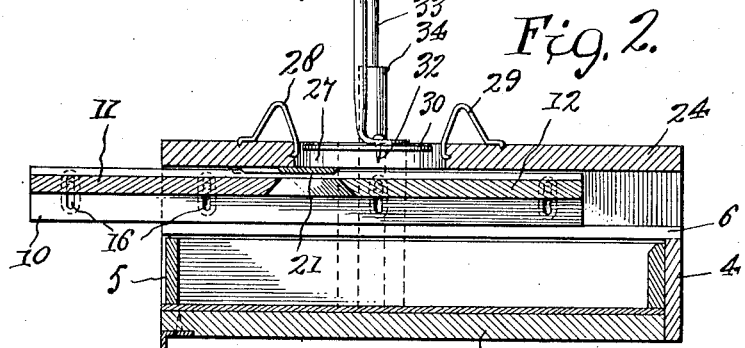
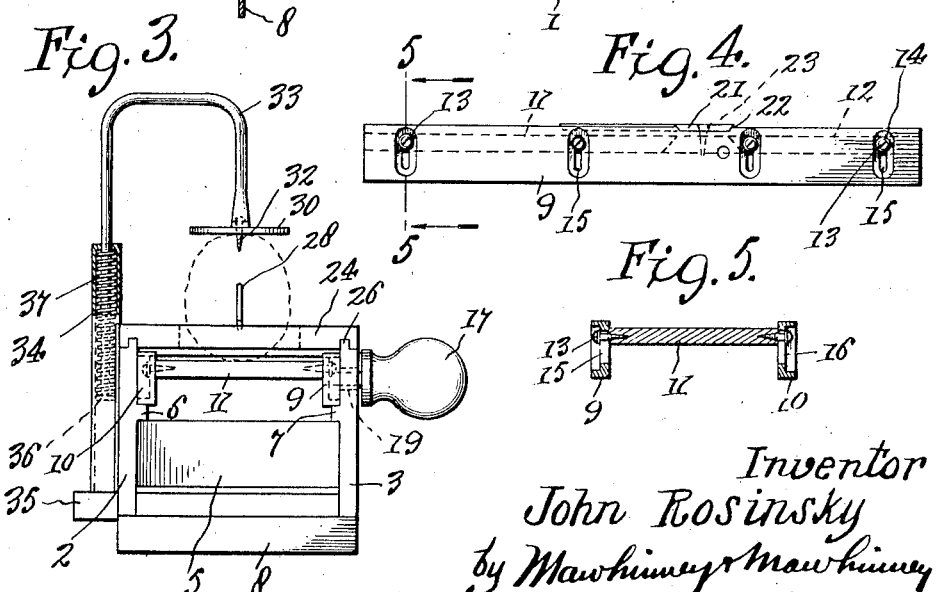
Inventor
John Rosinsky
by Mawhinney & Mawhinney
Attorneys.

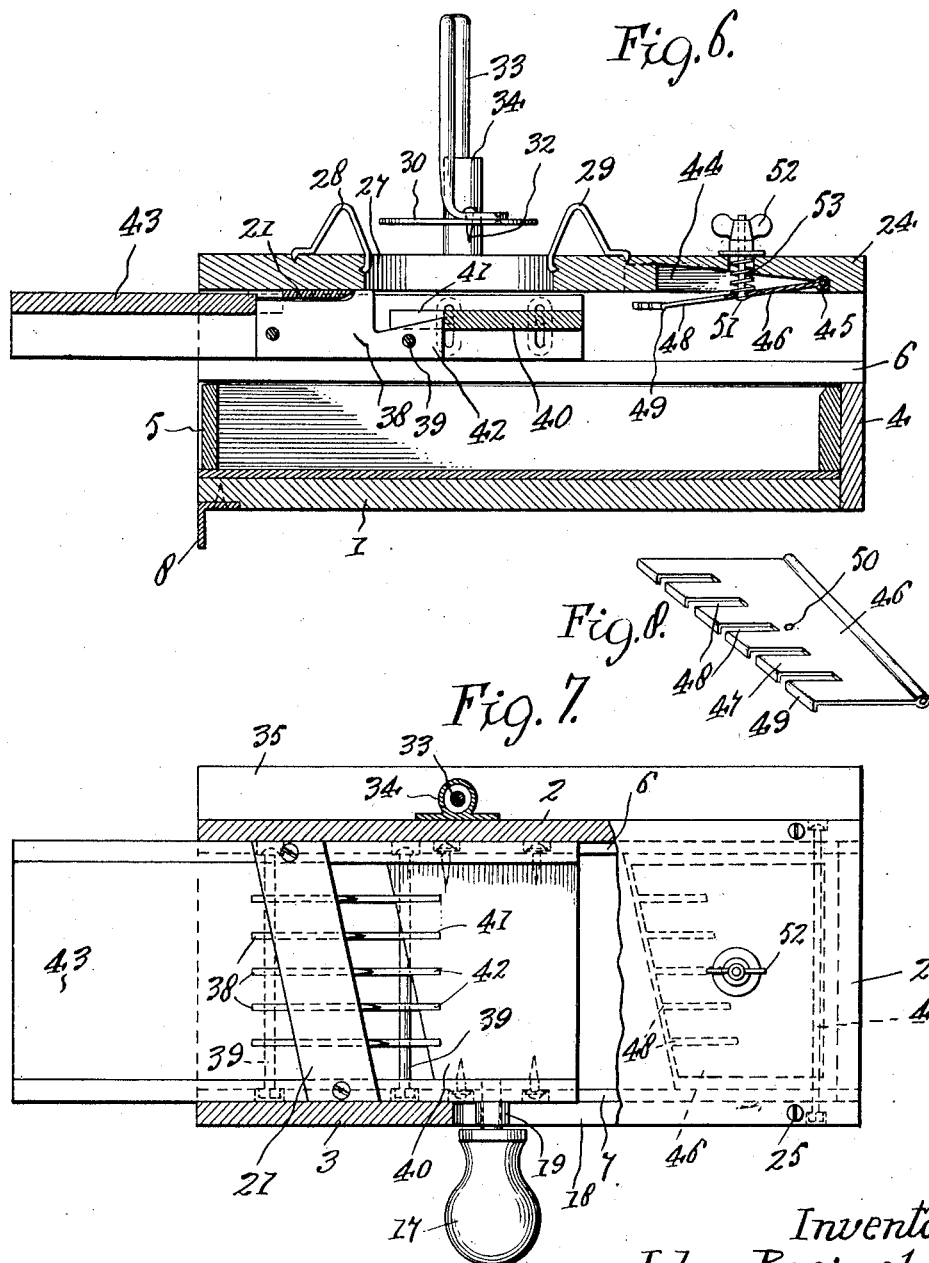

UNITED STATES PATENT OFFICE.

JOHN ROSINSKY, OF MANITOWOC, WISCONSIN.

POTATO CHIPPER AND SLICER.

1,358,020.　　　Specification of Letters Patent.　　Patented Nov. 9, 1920.

Application filed June 4, 1920.　Serial No. 386,567.

*To all whom it may concern:*

Be it known that I, JOHN ROSINSKY, a citizen of the United States, residing at Manitowoc, in the county of Manitowoc and State of Wisconsin, have invented new and useful Improvements in Potato Chippers and Slicers, of which the following is a specification.

The present invention relates to improvements in potato chippers and slicers, and has for an object to provide an improved hand implement for the slicing of potatoes or other like vegetables in an expeditious manner.

Another object of the invention is to provide a simple and inexpensive device of the above character which will both cut the potato into thin slices for use as potato chips or may be employed to divide the potato into strips suitable for making French fried potatoes.

A further object of the invention resides in providing an improved implement for slicing potatoes or the like vegetables which will hold the same in contact with a reciprocating knife without the operator employing his hands for this purpose.

In describing the invention in detail reference will be made more particularly to the drawings wherein like parts are denoted by like reference symbols throughout the several views, and in which—

Figure 1 is a top plan view with parts broken away of an improved potato chipper and slicer constructed according to the present invention.

Fig. 2 is a longitudinal sectional view taken on the line 2—2 in Fig. 1.

Fig. 3 is an end view of the device with a portion shown in section.

Fig. 4 is a side view of the slide.

Fig. 5 is a transverse sectional view taken on the line 5—5 in Fig. 4.

Fig. 6 is a longitudinal sectional view taken through the machine and showing a slight modification.

Fig. 7 is a plan view with parts broken away of the device shown in Fig. 6, and

Fig. 8 is a perspective view of the stop.

Referring more particularly to the drawings, 1 designates a base plate or bottom on which sides 2 and 3 are erected. These sides together with the base or bottom 1 form a box-like structure partially closed at one end by a head 4.

A tray 5 of any suitable construction is adapted to slide through the open end of the box-like structure and fits beneath shoulders 6 and 7 extending inwardly from the sides 2 and 3. The base plate 1 is adapted to rest on a table or other support, and is provided with an angle iron 8 at one end to engage the edge of the table or support against which the device may be firmly held to prevent its sliding.

A slide rests upon the tops of the shoulders 6 and 7 and is composed of a pair of side rails 9 and 10 having gage boards 11 and 12 connected therebetween as by screws 13 and 14 entering slots 15 and 16 in the side rails 9 and 10. The slots 15 and 16 extend vertically and permit of the adjustment of the gage boards 11 and 12. The rails 9 and 10 as shown to best advantage in Fig. 5 are preferably of a channel construction so that the heads of the screws 13 and 14 may be housed and prevented from accidentally coming into contact with the sides 2 and 3.

The channel construction also reduces the area of the side rails 9 and 10 that comes into contact with the sides 2 and 3 thereby reducing the friction and permitting the slide to move freely back and forth in response to the movement of the hand of the operator without excessive exertion. A reciprocating movement is adapted to be imparted to the slide by means of a handle 17 which projects laterally through a slot 18 made in the wall 3.

A roller 19 is preferably carried by the shank of the handle to bear against the walls of the slot 18 and facilitate the movement. A buffer 20 is provided at one or both ends of the slot 18 in order to encounter the roller 19 and cushion the shock at each stroke.

The rails 9 and 10 carry a knife blade 21 which fits in recesses 22 in the side rails and is secured therein by suitable fastenings such, for instance, as the screws 23. As indicated in Fig. 1, the knife is disposed diagonally and is provided with double cutting edges so that it may act on the vegetable when moved in either direction.

In like manner the adjacent edges of the gage boards 11 and 12 are beveled and cut diagonally to conform to the position and location of the two cutting edges of the blade 21.

The upper portion of the box-like structure is left open at both ends above the shoulders 6 and 7 in order that the slide may be moved outwardly therebeyond as it is reciprocated. The box-like structure is inclosed at its top by a cover plate 24 removably secured as by screws 25 or other fastenings.

A tenon or mortise joint 26 is preferably provided between the top 24 and the sides 2 and 3, but this is not essential. In the top 24 is made an opening 27 in which to place the potato or other vegetable to be cut, the opening being preferably elliptical and of a size to accommodate potatoes of varying widths.

A pair of guide jaws 28 and 29 are secured at opposite sides of the opening 27 and tend to direct the potato centrally down into the opening and to the knife 21 which reciprocates therebeneath.

A pressure plate 30 is adapted to bear on the potato or other vegetable in order to force the same into active engagement with the knife and this pressure plate 30 is preferably formed with numerous perforations 31 and with a point or prong 32 projecting downwardly beneath the same and adapted to enter the potato in order to keep it from escaping from beneath the pressure plate.

A gooseneck 33 carries the pressure plate 30 and fits within a cylinder 34 carried on a beam 35 at the side of the machine. The lower end of the gooseneck which fits within the cylinder 34 is provided with a head 36 against which the lower end of a coil spring 37 engages, the function of which is to maintain the plate 30 under pressure and force the potato downwardly into the knife.

In operation the gooseneck 33 beneath the pressure plate 30 is shown in dotted lines in Fig. 3. The potato is engaged by the prong 32 and is guided by the jaws 28 and 29 into the opening 27 where its lower end is in the path of the knife 21. The operator reciprocates the slide through the handle 17 thus causing the beveled and diagonally disposed double edges of the blade 21 to alternately pass through the potato and cut the same into slices which will fall into the tray 5 beneath and may be removed by sliding the tray outwardly when the slices have accumulated in sufficient quantity.

The thickness of the slices may be controlled by the adjustment given the gage boards 11 and 12. In case very thin slices are required the gage boards 11 and 12 are held in the position shown in Figs. 2 and 4 of the drawings wherein the screws 13 and 14 are shown at the upper ends of the slots 15 and 16. On the other hand should thicker slices be preferred, the set screws 13 and 14 may be loosened and the gage boards 11 and 12 moved downwardly so as to leave a greater gap between the same and the knife 21. The screws are thereupon retightened. The pressure plate 30 will keep the potato pressed against the gage boards so that thicker slices will now be cut.

The gooseneck 33 is swingingly supported in the cylinder 34 in order to permit of the insertion of fresh potatoes. The device as above described is more particularly useful for cutting of potatoes in relatively thin slices for the purpose of preparing what are known as potato chips.

Referring more particularly to Figs. 6, 7, and 8, substantially the same device is herein shown, similar parts being similarly numbered, but in this instance the slide is provided with a plurality of vertically disposed knives 38 in addition to the diagonal horizontal knife 21, the knives 38 being five in number as shown in Fig. 7 although a greater or less number may be employed and the same are secured to the side rails and held suspended by a pair of bolts 39.

In this instance the knife 21 is preferably provided only with a single edge and a single gage board 40 having vertical adjustment as above described and is mounted in conjunction with the slide having slots 41 adapted to receive the extensions 42 of the knives 38. Of course, this construction could be duplicated on the opposite side of the horizontal knife 21 should this be desirable. In this instance, a board 43 is provided at the opposite side of the horizontal knife 21 and serves to prevent the potato from being pushed through the slot. The cover 24 in this instance is provided with a recess 44 in which is hinged as indicated at 45 a stop plate 46 having a number of fingers 47 with slots 48 therebetween to admit the knives 38.

The fingers are also provided with downturned ends 49 adapted to engage the cut piece of the potato while the knives 38 pass through the same. A perforation 50 in the plate 46 is adapted to receive a bolt 51 passing up through the cover 24 and provided with a winged adjusting nut 52. A coil spring 53 surrounds the bolt and acts to force the same downwardly when permitted by the nut 52.

In operation the plate 46 normally occupies substantially the position shown in Fig. 6 so that when the slide is moved toward the right by operation of the handle 17 the horizontal knife 21 will cut a deep slice from the bottom of the potato pressed down against the gage board 40 by the pressure plate 30, this deep slice being received on said board 40. As the slide continues to move toward the right the right hand end of the slice just cut will encounter the downturned ends 49 of the fingers 47 on the stop plate 46, this action arresting the further movement of the slice of potato holding it, while the knives 38 pass therethrough cutting the same into long strips suitable for making French fried potatoes. The strips as they are cut fall between the knives 38 into the tray 5 from which they are subsequently removed.

The stop plate 46 may be drawn up into the recess 44 when its use is not desired and the device may be then used as a slicer for potato chips.

I have described preferred and satisfactory constructions, but it is obvious that changes might be made provided such changes are within the spirit of the invention and within the scope of the appended claims.

What is claimed is:

1. A device of the character described including a cabinet having an opening therein to receive a vegetable and a recess, a reciprocating slide in said cabinet, means to actuate said slide, a slicing knife carried by said slide, a plurality of cutting knives disposed relatively to the slicing knife for dividing the slice into a number of strips, a gage board disposed relatively to the slicing knife for regulating the depth of the slice, and a pivotally mounted stop plate movable into and out of said recess and having fingers with down-turned ends adapted to engage the cut slice and arrest its movement, and means for shifting the stop plate.

2. A device of the character described including a cabinet, a movable slide in the cabinet, means to actuate said slide, a slicing knife carried by said slide, a plurality of cutting knives disposed relatively to the slicing knife for dividing the slices into a number of strips, a gage board disposed relatively to the slicing knife for regulating the depth of the slice, and a pivotally mounted stop plate having fingers with downturned ends adapted to engage the cut slice and arrest its movement.

3. A device of the character described including a cabinet adapted to receive a vegetable, a movable slicing knife in the cabinet, a plurality of cutting knives placed relatively to said slicing knife for dividing the slice into a number of strips, means to actuate said slicing and cutting knives, a movably mounted stop plate having fingers adapted to enter between the cutting knives and adapted to engage the end of the slice to arrest its movement, and means whereby said stop plate may be withdrawn from the path of the knives and held in retracted position.

4. In a device of the character described, the combination of a cabinet, a slide fitted to reciprocate in said cabinet, a diagonally disposed slicing knife carried by said slide, a plurality of cutting knives placed relatively to said slicing knife whereby the cutting knives may divide the slice into a number of strips, said cutting knives being also carried by said slide, means whereby said slide may be reciprocated, gage means carried by said slide for regulating the depth of the slice cut, means for pressing the vegetable into the path of the knives, and a stop plate movable into and out of the path of the knives and having separated fingers adapted to enter between the cutting knives, said fingers adapted to arrest the movement of the slice.

5. In a device of the character described, the combination of a cabinet adapted to receive a vegetable and having a recess therein, movable means adapted to cut a slice from the vegetable and divide such slice into a number of strips, a stop plate in the cabinet pivotally mounted in said recess and adapted to project therebeneath into the path of the cut slice for arresting its movement, and means for swinging said stop plate about its pivot to draw it into and out of the recess.

6. The combination with a cabinet having a receiving opening and cutting means movable past the opening, of a perforated pressure plate situated above such opening, a prong extending down from the plate and adapted to enter a vegetable, a goose-neck carrying said plate, a cylinder at the side of the cabinet slidingly and swingingly receiving the opposite end of the goose-neck, and spring means within the cylinder connected to the end of the goose-neck therein and acting to impose pressure on said plate.

JOHN ROSINSKY.